UNITED STATES PATENT OFFICE.

SIMON SPARROW, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

POLYPHASE MOTOR.

992,280. Specification of Letters Patent. Patented May 16, 1911.

Application filed April 30, 1910. Serial No. 558,644.

*To all whom it may concern:*

Be it known that I, SIMON SPARROW, a citizen of the United States, residing at St. Louis, Missouri, have invented a certain new and useful Polyphase Motor, of which the following is such a full, clear, and exact description as will enable any one skilled in the art to which it appertains to make and use the same, reference being had to the accompanying drawings, forming part of this specification.

My invention relates more particularly to polyphase induction motors having a single distributed winding of the closed coil type. Devices heretofore proposed for diminishing the current taken by such polyphase motors at starting or for increasing the starting torque per ampere or for both purposes, comprise auxiliary resistances or the like.

In my invention I not only reduce the current taken at starting but I also increase the torque per ampere while making use in my improved motor of only one winding on the induced member and of only the usual polyphase windings on the inducing member.

My construction greatly improves the space factor of the rotor thus increasing the running efficiency of the machine while it enables me at the same time to secure the most desirable starting conditions.

Broadly speaking, my invention consists in providing the induced member of an ordinary polyphase induction motor with a winding comprising a plurality of elements, in permanently short-circuiting a part only of the total number of said elements and in providing means whereby all of the elements of my winding are short-circuited in any desired or convenient manner after the motor has reached a sufficient speed.

Figure 1:
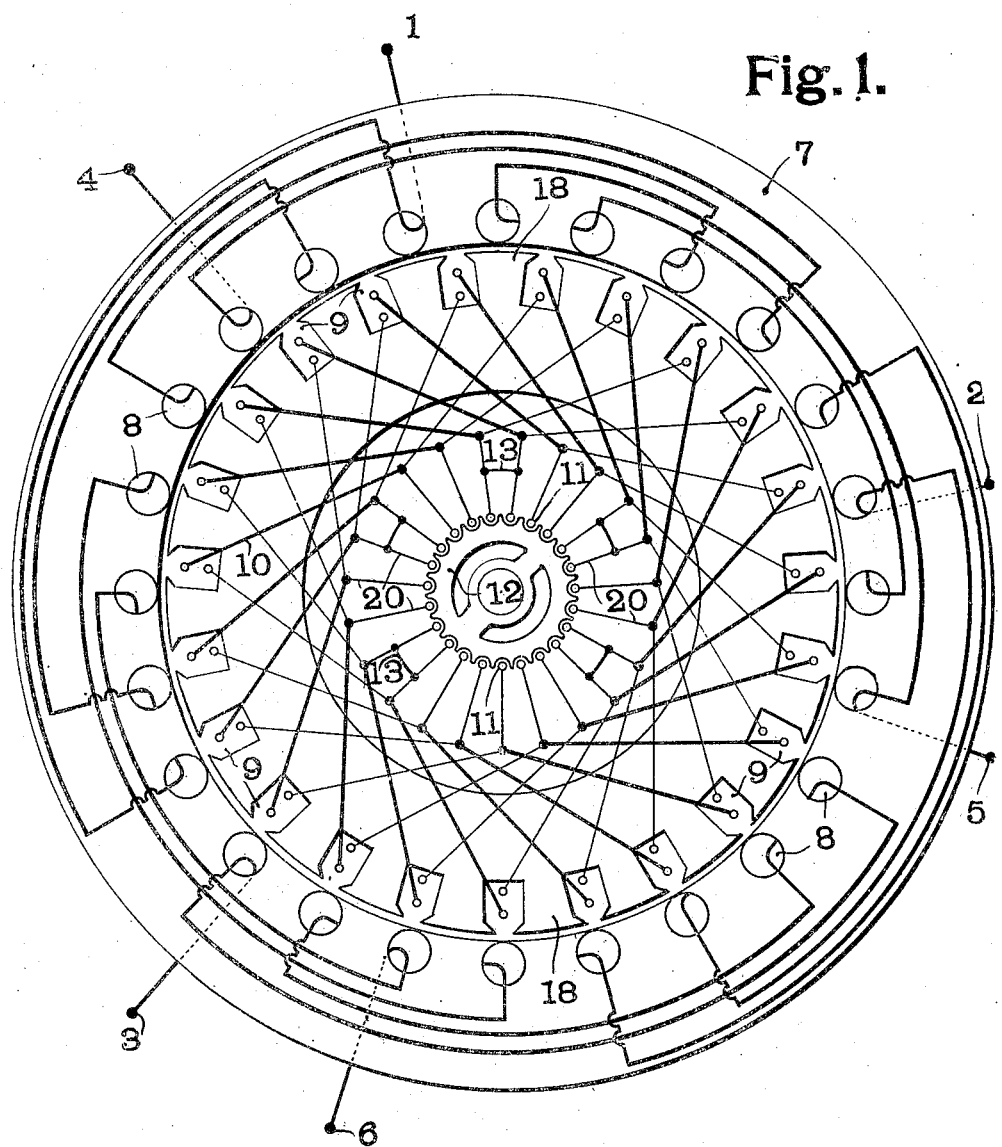
Figure 2:
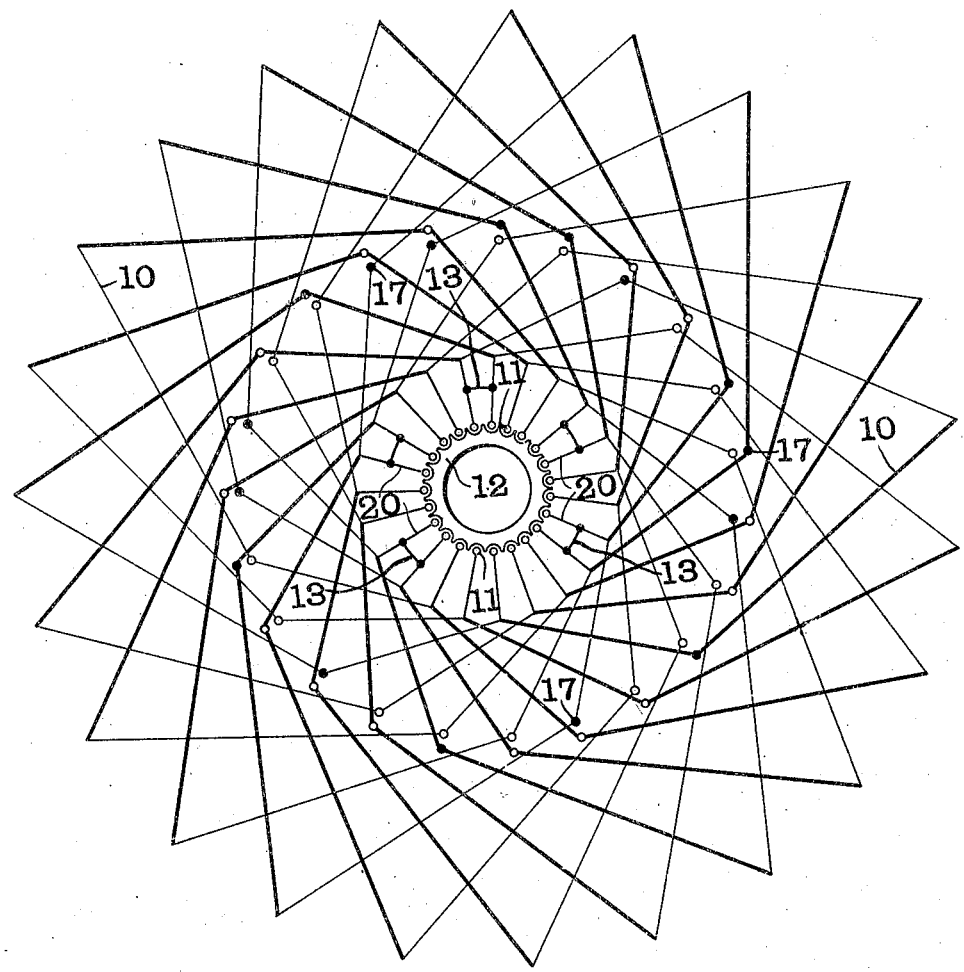

For the more complete understanding of my invention and its several advantages, reference is to be had to the following description taken in connection with the accompanying drawings in which Figure 1 is a diagrammatic representation of one form of a four-pole three-phase motor embodying my invention and Fig. 2 is a complete diagram of the winding made use of on the induced member of Fig. 1.

The stator 7 of Fig. 1 carries three four-pole windings 1—2, 3—4 and 5—6 disposed in the slots 8 and so arranged that they can be suitably inter-connected to form a three-phase star or delta connected winding as is well understood. The rotor 18 is provided with a four-pole drum winding 10 located in slots 9 and comprising a plurality of elements. A suitable number of points of this winding are connected to contacts 11 by leads 20 and a conductor 12 is so disposed that it can be brought into contact with all of the points 11 thus short-circuiting every element of the rotor winding. A number of elements of the rotor winding are permanently short-circuited by means of the conductors 13.

A diagram of the rotor winding 10 is shown in Fig. 2. The winding shown consists of 23 elements or coils with two active conductors per coil located in 23 slots. The permanently short-circuited pairs of active conductors 17 are distinguished by black dots whereas those pairs of active conductors which become directly short-circuited when the conductor 12 is moved into contact with points 11 are distinguished by circles. The short-circuiting device 12 may be moved into contact with all the points 11 or only with such of said points as are not permanently short-circuited by the conductors 13. I prefer the former arrangement. It will be understood that my rotor winding may have any desired pitch. The winding shown in the figures has a pitch nearly equal to the pole pitch; a smaller or greater pitch may, however, be used. It is advisable to distribute the permanently short-circuited elements throughout the rotor winding.

When my improved motor is at rest then the short-circuiting device 12 is not in electrical contact with the rotor winding 10. As soon as the stator windings are connected to the polyphase supply a large torque is developed owing to the presence of the distributed and permanent short-circuits 13 while the motor takes little current. As soon as a sufficient speed has been reached then the short-circuiting device 12 is brought into electrical contact with the points 11 and the machine is ready to develop its maximum running torque.

Having fully described my invention what I claim as new and desire to secure by Letters Patent of the United States, is:

In an alternate current motor, the combination with an inducing member adapted to be energized by polyphase currents, of an induced member having a single distributed closed coil winding comprising a plurality of elements, a number of said elements being permanently short-circuited, and means for short-circuiting the remaining elements of said winding.

In testimony whereof, I have hereunto set my hand and affixed my seal in the presence of the two subscribing witnesses.

SIMON SPARROW. [L. S.]

Witnesses:
C. B. BENNETT,
M. L. FRANKLIN.